United States Patent
Ouyang

(10) Patent No.: US 8,395,368 B2
(45) Date of Patent: Mar. 12, 2013

(54) ADAPTIVE VOLTAGE POSITION DC-DC REGULATORS AND THE METHOD THEREOF

(75) Inventor: Qian Ouyang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 272 days.

(21) Appl. No.: 12/564,870

(22) Filed: Sep. 22, 2009

(65) Prior Publication Data

US 2010/0072970 A1  Mar. 25, 2010

(30) Foreign Application Priority Data

Sep. 23, 2008 (CN) .......................... 2008 1 0046122

(51) Int. Cl.
*G05F 1/04* (2006.01)
*G05F 1/08* (2006.01)
(52) U.S. Cl. ......... 323/293; 323/285; 323/290; 323/259
(58) Field of Classification Search .................. 323/224, 323/259, 271, 282, 284, 285, 290, 293
See application file for complete search history.

(56) References Cited

U.S. PATENT DOCUMENTS

| | | | |
|---|---|---|---|
| 6,469,481 B1 * | 10/2002 | Tateishi | 323/282 |
| 6,879,136 B1 * | 4/2005 | Erisman et al. | 323/282 |
| 7,106,035 B2 * | 9/2006 | Xing | 323/282 |
| 7,299,132 B2 * | 11/2007 | Sayers et al. | 702/9 |
| 7,299,135 B2 * | 11/2007 | Thayer | 702/21 |
| 7,358,710 B2 * | 4/2008 | Luo et al. | 323/282 |
| 7,394,264 B2 * | 7/2008 | Blanc et al. | 324/721 |
| 2009/0146635 A1 * | 6/2009 | Qiu et al. | 323/290 |
| 2009/0256538 A1 * | 10/2009 | Yu et al. | 323/282 |

* cited by examiner

*Primary Examiner* — Adolf Berhane
*Assistant Examiner* — Nusrat Quddus
(74) *Attorney, Agent, or Firm* — Perkins Coie LLP

(57) ABSTRACT

The present invention discloses an adaptive voltage position DC-DC regulator and the method thereof, the regulator comprising a main circuit and a control circuit which includes a sensing unit, a feedback unit, a comparing unit, a PWM generator and a driver. The regulator realizes the adaptive voltage position control with simple internal circuit and fewer pins.

16 Claims, 11 Drawing Sheets

ADAPTIVE VOLTAGE POSITION DC-DC REGULATORS AND THE METHOD THEREOF

CROSS-REFERENCE TO RELATED APPLICATION(S)

This application claims priority to and the benefit under 35 U.S.C. §119 of the filing date of Chinese Application Serial No. 200810046122.9, filed on Sep. 23, 2008, which is incorporated herein by reference in its entirety.

TECHNICAL FIELD

The present invention relates to DC-DC regulators, and more particularly, the present invention relates to adaptive voltage position DC-DC regulators.

BACKGROUND

Recently, adaptive voltage position (AVP) control has been widely used in DC-DC regulators. The basic principle of such AVP control is referred to FIG. 1, wherein the y-axis represents the output voltage $V_O$, while the x-axis represents the output current $I_O$. The mathematic relation of the output voltage $V_O$ and the output current $I_O$ is:

$$V_O = V_{SET} - R * I_O \quad (1)$$

wherein the coefficient R represents the variation slope. Both $V_{SET}$ and R are constants.

According to equation (1), the output voltage $V_O$ decreases when load current is increased rapidly (such as from light load condition to heavy load condition, i.e. the output current IO is increased). As can be seen from FIG. 2, the output voltage $V_O$ is decreased to $V_{MAX}$ from $V_{MIN}$. When load current is decreased rapidly (such as from heavy load condition to light load condition, i.e., the output current $I_O$ is decreased), the output voltage $V_O$ is increased to $V_{MIN}$ from $V_{MAX}$. The variation range of the output voltage is (VMAX−VMIN), wherein VMAX and VMIN are respectively the output voltage $V_O$'s allowed positive and negative fluctuating values. However, as shown in the middle graph of FIG. 2, to those circuits without AVP control, the output voltage $V_O$ is firstly decreased to VMIN, and then back to V immediately when load current is increased rapidly at time t1. Similarly, $V_O$ is increased to VMAX, and then back to V immediately when load current is decreased rapidly at time t2. Thus the variation range of the output voltage of these circuits is 0.5*(VMAX−VMIN). However, the variation range of the output voltage of circuits with AVP control is twice than that without AVP control as shown in the bottom graph of FIG. 2. Furthermore, when load current is increased, the output voltage of circuits with AVP control is decreased accordingly, which reduces power loss.

Prior art adaptive voltage position control is shown in FIG. 3. As shown in FIG. 3, a circuit 50 includes a conventional buck circuit as its main circuit which comprises a switch S1, a switch S2, an inductor L, a capacitor C0, and a load RL. Circuit 50 further includes a control circuit which comprises a current sensing resistor RS which is coupled between the inductor L and the capacitor C0, feedback resistors R1 and R2 which are coupled to the load RL in parallel, a comparator U0, an operational transconductance amplifier (OTA) U1, a current source A, a PWM generator and a driver. The OTA U1 has its two input terminals receive the drop voltage of the current sensing resistor RS, and converts the voltage into corresponding current ISENSE which is sent to the first input terminal of the PWM generator.

Feedback resistors R1 and R2 constitute a voltage divider, which feeds back the output voltage to the inverting input terminal of the comparator U0 via the resistor R3. The comparator U0 receives a reference VREF at its non-inverting input terminal. Current (I=K*ISENSE) provided by the current source US is sent to the inverting input terminal of the comparator U0 and one terminal of the resistor R3, wherein K is a constant coefficient, while ISENSE is the output current of the OTA U1. The output terminal of the comparator U0 is coupled to one terminal of a compensation net Zf—the other terminal of the compensation net Zf is grounded. The output terminal of the comparator U0 is also coupled to the second input terminal of the PWM generator. The PWM generator has its third input terminal receive a CLK signal, while its output terminal is coupled to the input terminal of the driver. The two output terminals of the PWM generator are coupled to the gates of the switches S1 and S2, respectively.

The operation of the main circuit of circuit 50 is as the operation of the conventional buck circuit, which is not illustrated herein for brevity. The operation of the control circuit of circuit 50 is illustrated as follows.

Since the comparator U0 exhibits a high impedance, the current provided by the current source US flows to the resistor R3. According to the "virtual short" characteristic of the comparator U0, the voltage at its non-inverting input terminal is equal to that at its inverting input terminal, namely, $$\frac{V_O * R_2}{R_1 + R_2} + I * R_3 = V_{REF},$$

thus, $$V_O = \frac{(R_1 + R_2)*(V_{REF} - I*R_3)}{R_2} = \frac{V_{REF}*(R_1+R_2)}{R_2} - \frac{R_3*(R_1+R_2)}{R_2}*I$$

wherein I=K*ISENSE. As a result, $$V_O = \frac{V_{REF}*(R_1+R_2)}{R_2} - \frac{R_3*(R_1+R_2)}{R_2}*I = \quad (2)$$

$$\frac{V_{REF}*(R_1+R_2)}{R_2} - \frac{R_3*(R_1+R_2)}{R_2}*K*I_{SENCE}$$

Since ISENSE is determined by the output current IO, equation (2) behaves as the same function of the output voltage VO and the output current IO as equation (1).

Therefore prior art circuit 50 realizes the AVP control. That is, when the load current of circuit 50 is increased rapidly from light load condition to heavy load condition, the drop voltage of the current sensing resistor RS is increased, which causes the output current ISENSE of the OTA U1 to be increased. Thus the output current I of the current source US is increased, which causes the output voltage of circuit 50 to be deceased according to equation (2). On the contrary, when the load current of circuit 50 is decreased rapidly from heavy load condition to light load condition, the drop voltage of the current sensing resistor RS is decreased, which causes the output current ISENSE of the OTA U1 to be decreased. Thus the output current I of the current source US is decreased, which causes the output voltage of circuit 50 to be increased according to equation (2). Therefore, circuit 50 realizes the advantages of the AVP control such as a wide variation range of the output voltage and low power loss.

However, prior art circuit 50 receives the output current which is fed back by the current sensing resistor RS through the OTA U1, which requires two additional pins. In addition, the current sensing resistor RS consumes power, which decreases the efficiency. Furthermore, circuit 50 needs a current source US reflecting the output current, which causes the internal circuit complicated.

As a result, there is a need to provide a regulator which realizes the AVP control with simple internal circuit and fewer pins.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
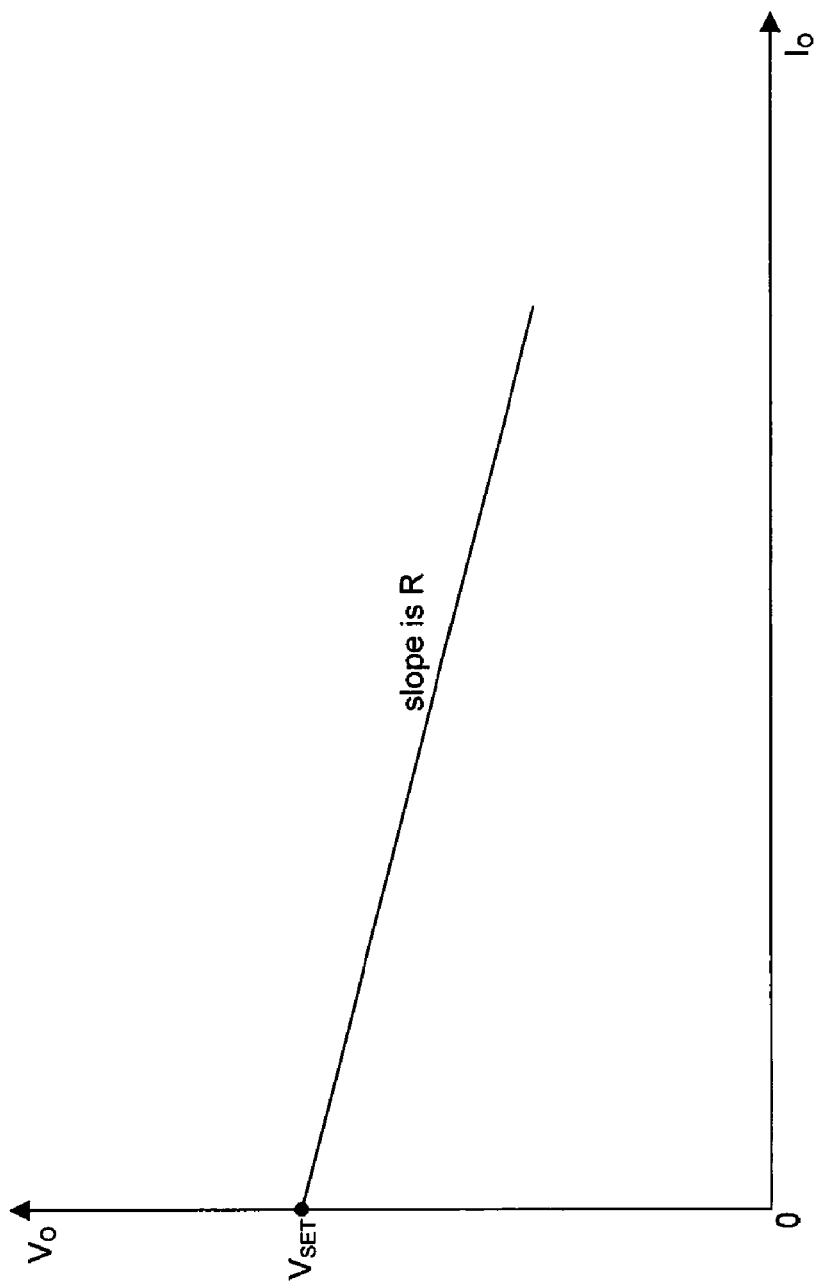
FIG. 1 illustrates the basic principle of AVP control in a mathematic relation.
Figure 2:
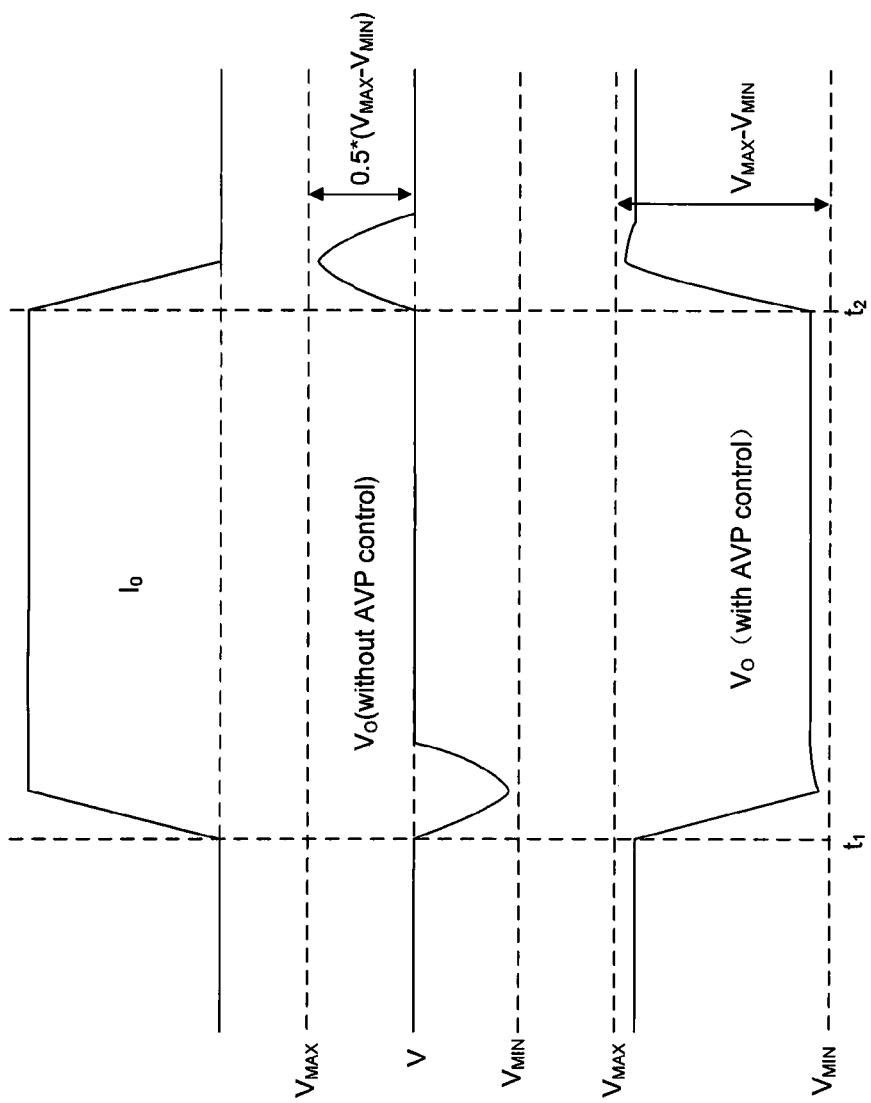
FIG. 2 illustrates the output voltage comparison of circuits with and without AVP control.
Figure 3:
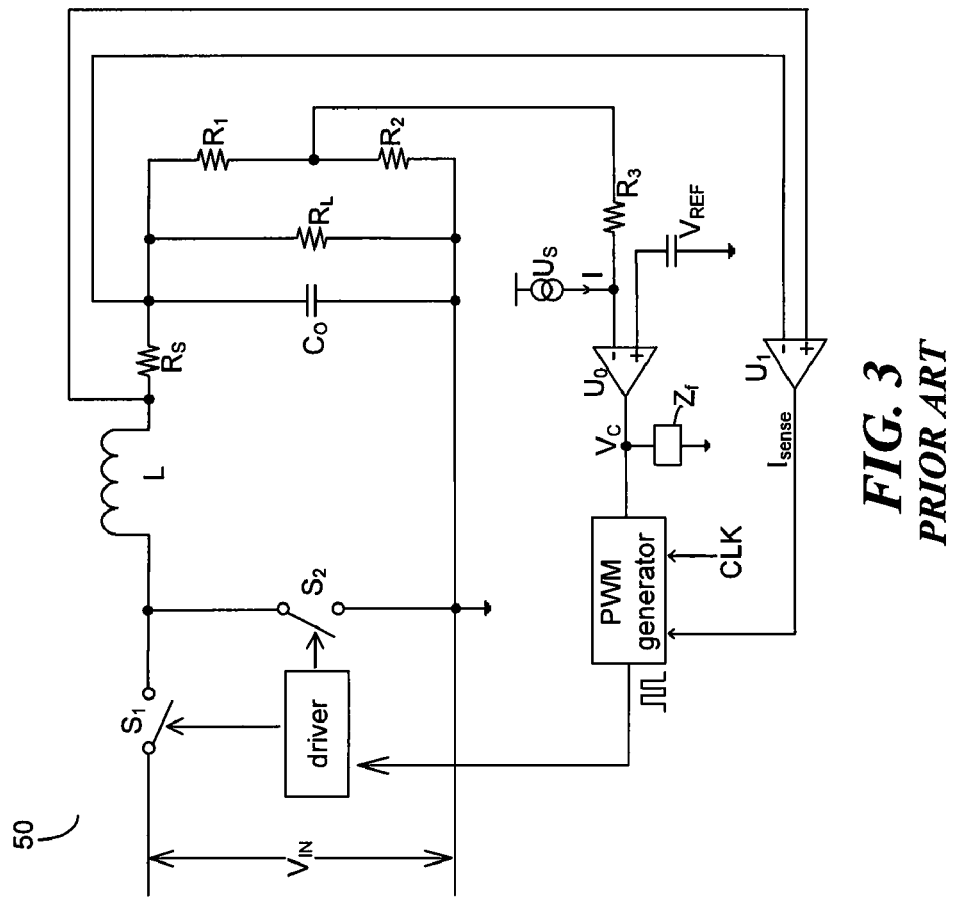
FIG. 3 is a schematic diagram of a prior art circuit with AVP control.
Figure 4:
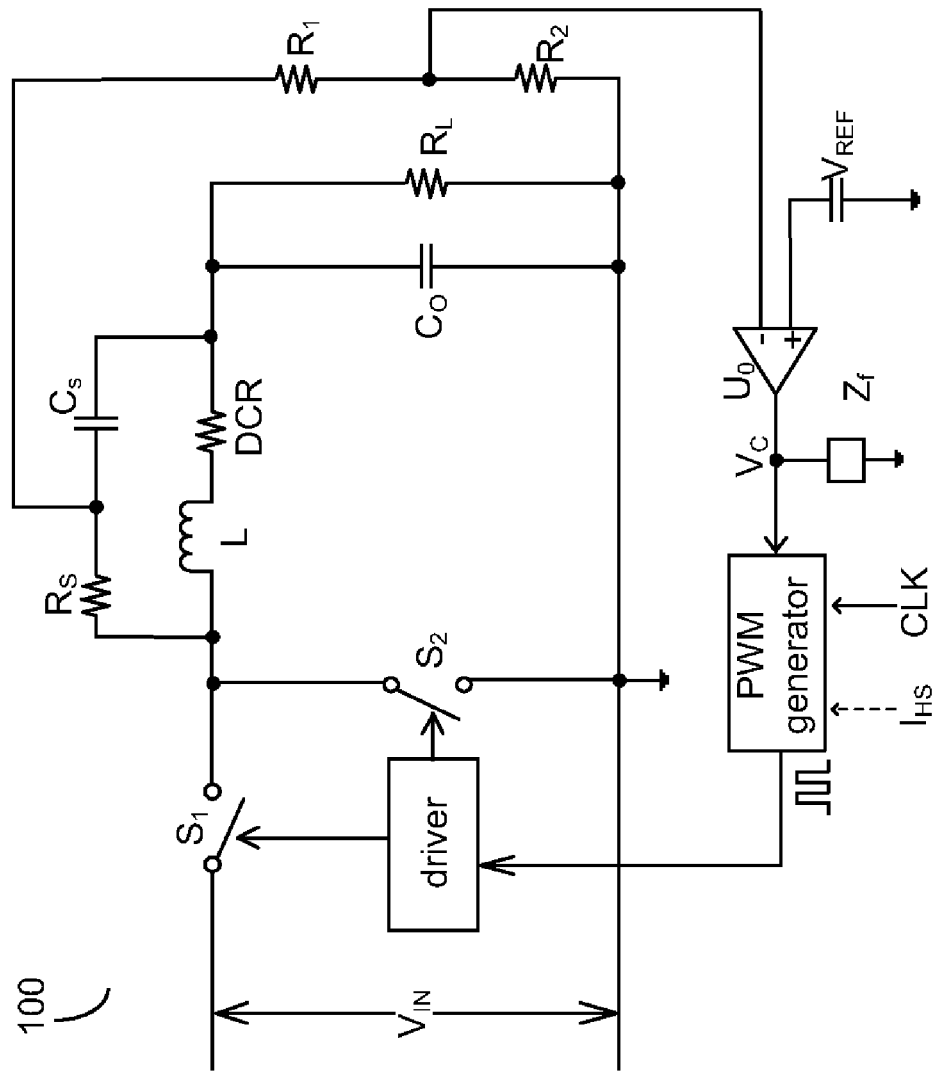
FIG. 4 is a schematic diagram of a circuit with AVP control in accordance with an embodiment of the present invention.

Now referring to FIG. 4, a schematic diagram of circuit 100 with AVP control in accordance with an embodiment of the present invention is illustrated. It is the first embodiment of the present invention. Like elements in FIG. 4 that are similar to prior art circuit 50 as shown in FIG. 3 have the same reference numbers and titles. As shown in FIG. 4, circuit 100 includes a conventional buck circuit as its main circuit which comprises two switches S1 and S2, an inductor L, a capacitor C0, and a load RL connected as shown. Circuit 100 also includes a resistor DCR which is the DC resistor of the inductor L, electrically coupled between the inductor L and the output capacitor CO. Circuit 100 further includes a control circuit which comprises a sensing unit, a feedback unit, a comparing unit, a PWM generator and a driver. In one embodiment, the sensing unit comprises a resistor RS and a capacitor CS coupled in series between the common coupled terminal of the switch S1, the switch S2 and the inductor L and the common coupled terminal of the inductor L's DC resistor DCR, the output capacitor CO and the load RL. The sensing unit senses the output current of the regulator and converts it into a corresponding voltage, which is provided to the feedback unit.

In one embodiment, the feedback unit is a divider comprised of a first resistor R1 and a second resistor R2, which are coupled in series between the sensing unit and ground as shown. In one embodiment, the comparing unit includes a comparator U0 and a compensation net Zf—wherein the compensation net Zf is coupled between the output terminal of the comparator U0 and ground for compensation. The comparator U0 receives a feedback signal from the feedback unit at its inverting input terminal and a reference VREF at its non-inverting input terminal. The output of the comparator U0 is a comparison signal which is provided to the PWM generator. The PWM generator also receive a CLK signal (the clock signal generator is not shown) at another input terminal. If current control mode is adopted, the PWM generator will further receive a current sense signal of the switch S1 or the inductor current which is represented as IHS in dotted lines. The output of the PWM generator is a PWM signal which is provided to the driver. In one embodiment, the driver receives the PWM signal and provides two driving signals to the control terminals of the switch S1 and the switch S2, so as to control the ON and OFF status of these two switches. The PWM generator and the driver may be any conventional circuit designed for that purpose.

The main circuit of circuit 100 adopts the conventional buck circuit, its operation is well known and will not be illustrated herein for brevity. The following text will illustrate how to realize AVP control by circuit 100.

According to the "virtual short" characteristic of the comparator U0, the voltage at its non-inverting input terminal is equal to that at its inverting input terminal, whose value is:

$$\frac{(V_O + V_{CS}) * R_2}{R_1 + R_2},$$

wherein VO is the output voltage of circuit 100, VCS is the drop voltage across the capacitor CS.

Thus (3)

$$\frac{(V_O + V_{CS}) * R_2}{R_1 + R_2} = V_{REF},$$

$$\Rightarrow V_O = \frac{(R_1 + R_2)}{R_2} * V_{REF} - V_{CS}$$

The voltage drop across the resistor $R_S$ added with the voltage drop across the capacitor $C_S$ is equal to the voltage drop across the inductor L and its DC resistor DCR. Computed in the S domain, the voltage drop across the capacitor $C_S$ is:

$$V_{CS} = \frac{\frac{1}{S*C_S}}{\frac{1}{S*C_S}+R_S} * (SL+DCR)*I_L \qquad (4)$$

wherein $I_L$ is the inductor current. Thus $$V_{CS} = \frac{\frac{S*L}{DCR}+1}{S*C_S*R_S+1} * DCR*I_L \qquad (5)$$

If the resistance of the resistor $R_S$ and the capacitance of the capacitor $C_S$ satisfy the mathematic relation:

$$C_S*R_S = \frac{L}{DCR} \qquad (6)$$

Then equation (5) becomes:

$$V_{CS} = DCR*I_L \qquad (7)$$

Combining equation (7) with equation (3), we get:

$$V_O = \frac{(R_1+R_2)}{R_2}*V_{REF} - V_{CS} = \frac{(R_1+R_2)}{R_2}*V_{REF} - DCR*I_L \qquad (8)$$

Since the inductor current $I_L$ is determined by the output current $I_O$, when the resistances of the resistors $R_1$, $R_2$, DCR, and the voltage level of reference $V_{REF}$ are set, equation (8) is equivalent, with respect to the output voltage $V_O$ and the output current $I_O$, to equation (1).

Furthermore, regulation method used in conventional DC-DC converters is adopted by the control circuit of circuit 100 through controlling the ON and OFF status of the switch $S_1$ and the switch $S_2$ via the PWM generator and the driver. Thus, control to the whole circuit 100 is realized.

Figure 5:
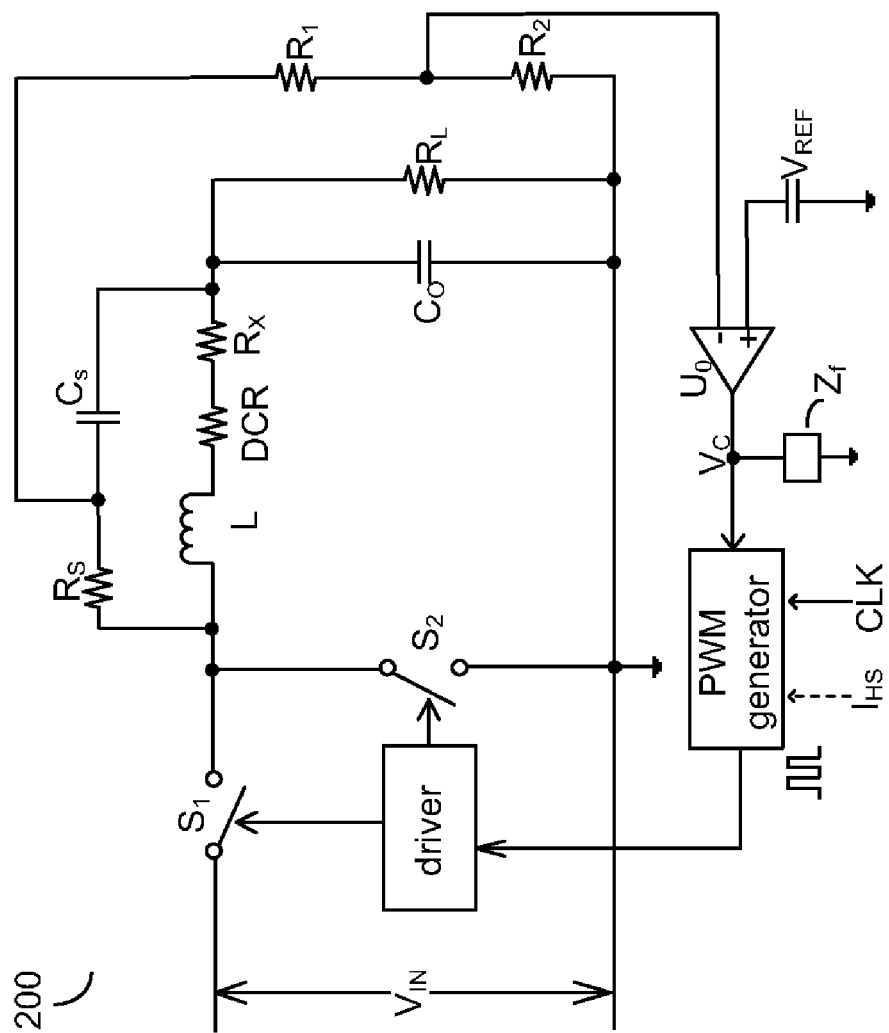
FIG. 5 is a schematic diagram of a circuit with AVP control in accordance with another embodiment of the present invention.

Referring to FIG. 5, a schematic diagram of circuit 200 with AVP control in accordance with another embodiment of the present invention is illustrated. It is the second embodiment of the present invention. In contrast to circuit 100 shown in FIG. 4, there is a resistor $R_X$ coupled in series with the inductor L and its DC resistor DCR, and in parallel with the resistor $R_S$ and the capacitor $C_S$ in circuit 200. That is, in one embodiment, the sensing unit comprises two resistors $R_S$, $R_X$ and one capacitor $C_S$. The resistor $R_X$ is added in case the resistance of the inductor's DC resistor DCR may be too small.

Figure 6:
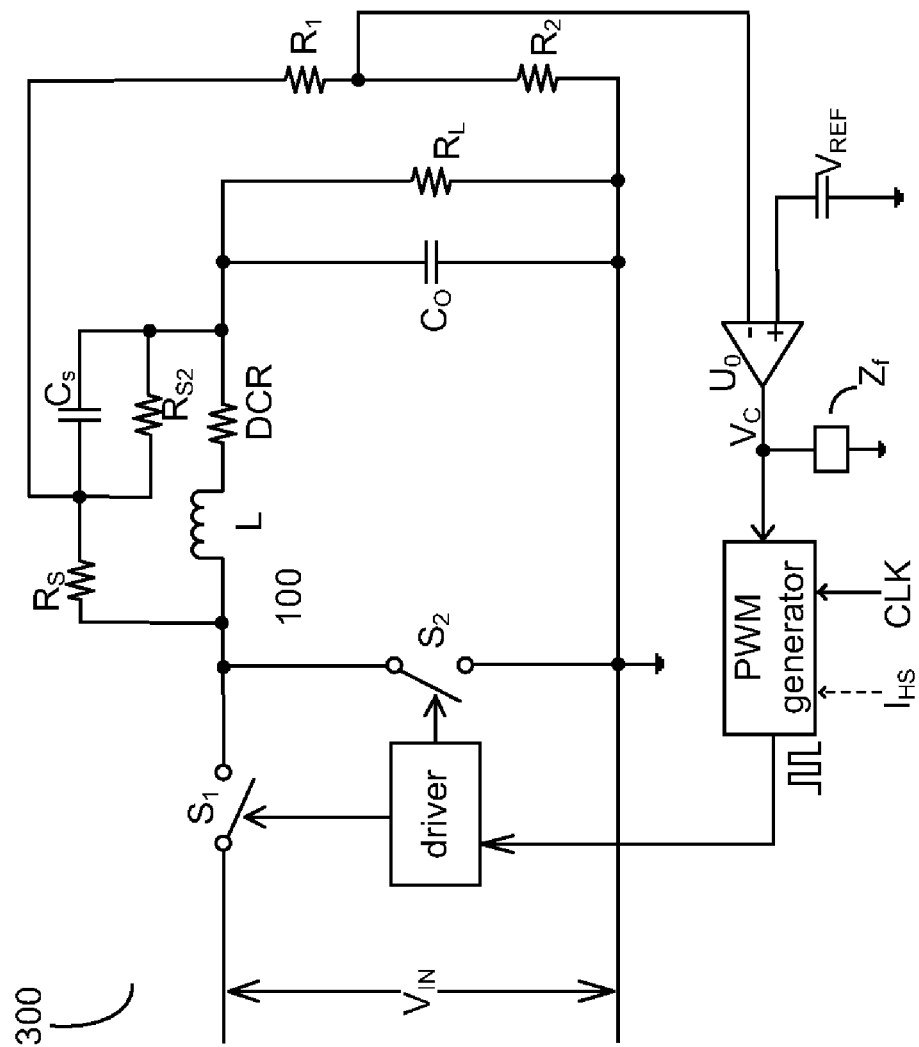
FIG. 6 is a schematic diagram of a circuit with AVP control in accordance with yet another embodiment of the present invention.

Referring to FIG. 6, a schematic diagram of circuit 200 with AVP control in accordance with yet another embodiment of the present invention is illustrated. It is the third embodiment of the present invention. In contrast to circuit 100 shown in FIG. 4, there is a resistor $R_{S2}$ coupled in parallel with the capacitor $C_S$ in circuit 300. That is, in one embodiment, the sensing unit comprises two resistors $R_S$, $R_{S2}$ and one capacitor $C_S$. The resistor $R_{S2}$ is first coupled in parallel with the capacitor $C_S$, and then they are coupled in series with the resistor $R_S$. The resistor $R_{S2}$ is used when the resistance of the inductor's DC resistor DCR may be too large.

Figure 7:
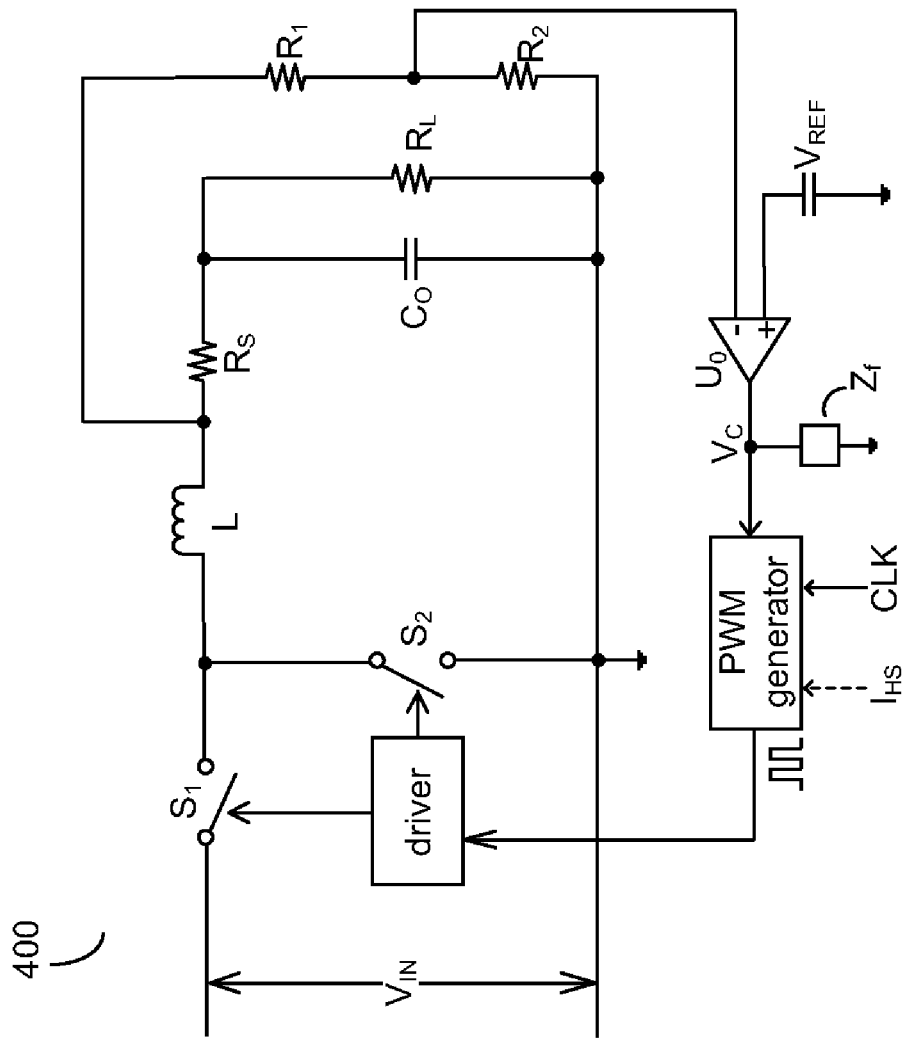
FIG. 7 is a schematic diagram of a circuit with AVP control in accordance with yet another embodiment of the present invention.

Referring to FIG. 7, a schematic diagram of circuit 400 with AVP control in accordance with yet another embodiment of the present invention is illustrated. It is the fourth embodiment of the present invention. In contrast to circuit 100 shown in FIG. 4, a resistor $R_S$ coupled in series with the inductor L replaces the series connected resistor $R_S$ and capacitor $C_S$. The inductor's DC resistor DCR is neglected. That is, in one embodiment, the sensing unit comprises one resistor $R_S$ which is coupled to the inductor L in series.

According to the "virtual short" characteristic of the comparator $U_O$, the voltage of the comparator $U_O$ at its non-inverting input terminal is equal to that at its inverting input terminal. That is:

$$\frac{(V_O+R_S*I_L)*R_1}{R_1+R_2} = V_{REF} \qquad (9)$$

$$=> V_O = \frac{(R_1+R_2)}{R_1}*V_{REF} - \frac{R_S}{R_1}*I_L \qquad (10)$$

Since the inductor current $I_L$ is determined by the output current $I_O$, when the resistances of the resistors $R_1$, $R_2$, and the voltage level of reference $V_{REF}$ are set, equation (10) behaves the same function of the output voltage $V_O$ and the output current $I_O$ as equation (1).

Furthermore, regulation method used in conventional DC-DC converters is adopted by the control circuit of circuit 400 through controlling the ON and OFF status of the switch $S_1$ and the switch $S_2$ via the PWM generator and the driver. Thus the control to the whole circuit 400 is realized.

Figure 8:
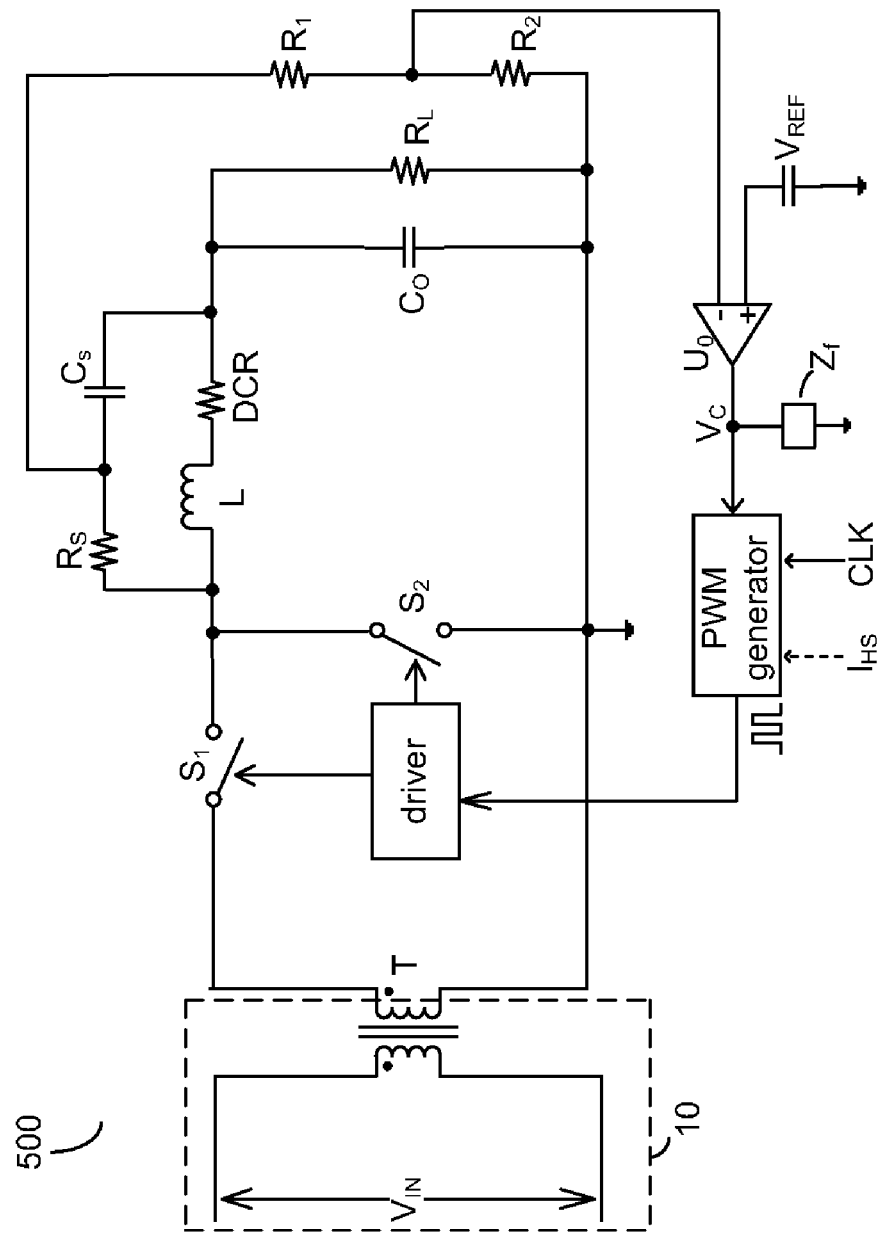
FIG. 8 is a schematic diagram of a circuit with AVP control in accordance with yet another embodiment of the present invention.

Referring to FIG. 8, a schematic diagram of circuit 500 with AVP control in accordance with yet another embodiment of the present invention is illustrated. It is the fifth embodiment of the present invention. In contrast to circuit 100 shown in FIG. 4, the input terminal of circuit 500 is coupled to the main circuit (the buck circuit) via an isolated circuit 10 with a transformer T. When the signal comes out from the isolated circuit 10, the operation principle of the subsequent part of circuit 500 is same to that of circuit 100, which will not be illustrated herein. Furthermore, the topology of the isolated circuit 10 can be half-bridge, full-bridge or forward, etc. The operation principle of the isolated circuit 10 is well known and will not be illustrated hereinafter.

Figure 9:
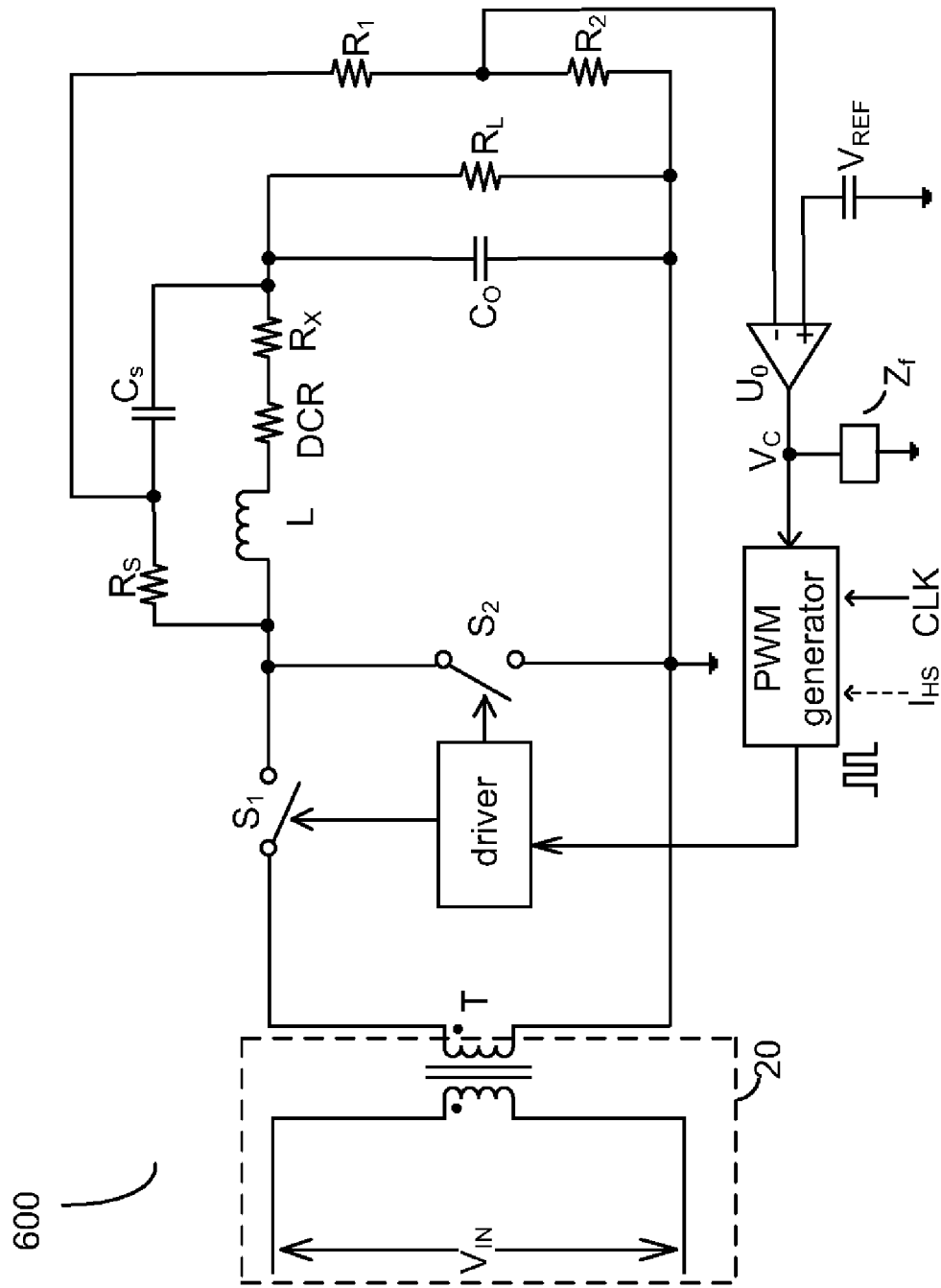
FIG. 9 is a schematic diagram of a circuit with AVP control in accordance with an embodiment of the present invention.

Referring to FIG. 9, a schematic diagram of circuit 600 with AVP control in accordance with yet another embodiment of the present invention is illustrated. It is the sixth embodiment of the present invention. In contrast to circuit 200 shown in FIG. 5, the input terminal of circuit 600 is coupled to the main circuit (the buck circuit) via a isolated circuit 20 with a transformer T. When the signal comes out from the isolated circuit 20, the operation principle of the subsequent part of circuit 600 is same to that of circuit 200, which will not be illustrated hereinafter. Furthermore, the topology of the isolated circuit 20 can be half-bridge, full-bridge or forward, etc. The operation principle of the isolated circuit 20 is well known and will not be illustrated hereinafter.

Figure 10:
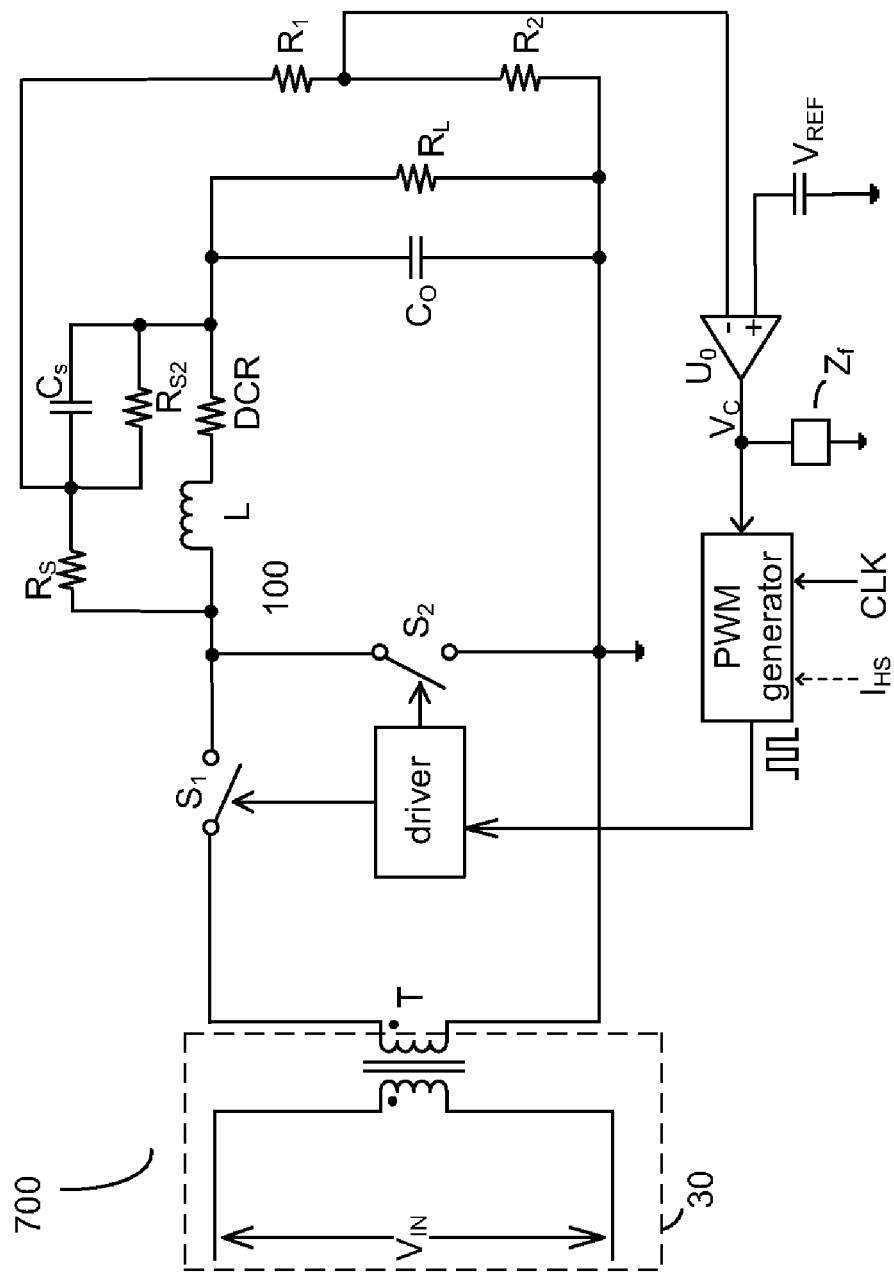
FIG. 10 is a schematic diagram of a circuit with AVP control in accordance with yet another embodiment of the present invention.

Referring to FIG. 10, a schematic diagram of circuit 700 with AVP control in accordance with yet another embodiment of the present invention is illustrated. It is the seventh embodiment of the present invention. In contrast to circuit 300 shown in FIG. 6, the input terminal of circuit 700 is coupled to the main circuit (the buck circuit) via a isolated circuit 30 with a transformer T. When the signal comes out from the isolated circuit 30, the operation principle of the subsequent part of circuit 700 is same to that of circuit 300, which will not be illustrated hereinafter. Furthermore, the topology of the isolated circuit 30 can be half-bridge, full-bridge or forward, etc. The operation principle of the isolated circuit 30 is well known and will not be illustrated hereinafter.

Figure 11:
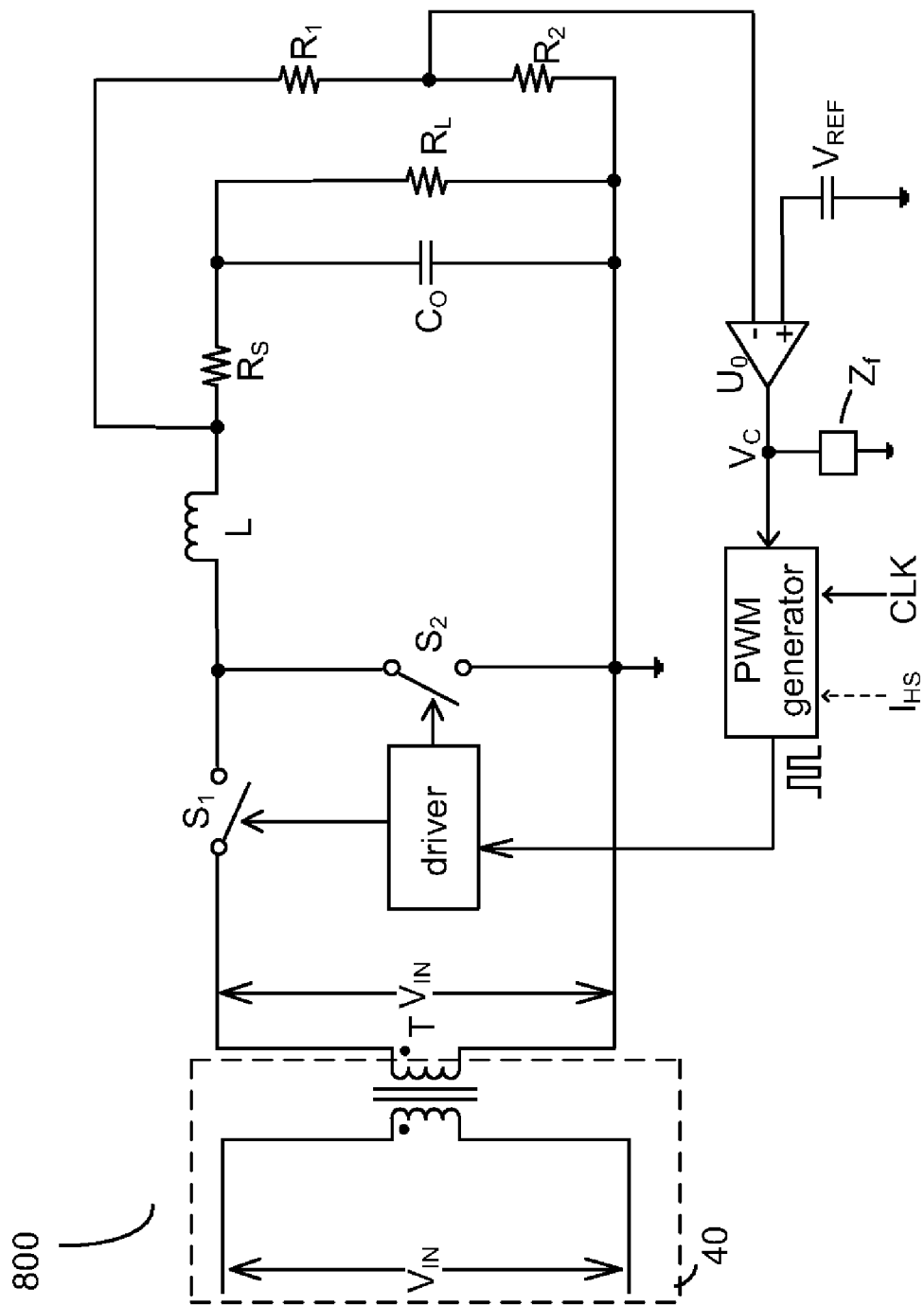
FIG. 11 is a schematic diagram of a circuit with AVP control in accordance with yet another embodiment of the present invention.

Referring to FIG. 11, a schematic diagram of circuit 800 with AVP control in accordance with yet another embodiment of the present invention is illustrated. It is the fifth embodiment of the present invention. In contrast to circuit 400 shown in FIG. 7, the input terminal of circuit 800 is coupled to the main circuit (the buck circuit) via a isolated circuit 40 with a transformer T. When the signal comes out from the isolated circuit 40, the operation principle of the subsequent part of circuit 800 is same to that of circuit 400, which will not be illustrated hereinafter. Furthermore, the topology of the isolated circuit 40 can be half-bridge, full-bridge or forward, etc. The operation principle of the isolated circuit 40 is well known and will not be illustrated hereinafter.

The present invention further provides an adaptive voltage position control method for the DC-DC regulator that includes a main circuit and a control circuit which includes a sensing unit, a feedback unit, a comparing unit, a PWM generator part and a driver. The method comprises: sensing the output current of the main circuit; converting the sensed current into a corresponding voltage signal; feeding back the voltage signal to get a feedback signal; comparing the feedback signal with a pre-determined value to get a comparison signal; sending the comparison signal to a PWM generator to get a PWM signal; sending the PWM signal to a driver to get a driving signal; and sending the driving signal to the main circuit. In one embodiment, the pre-determined signal is a reference $V_{REF}$.

As described above, circuit 100, circuit 200, circuit 300, circuit 400, circuit 500, circuit 600, circuit 700, and circuit 800 provided in the present invention realize the adaptive voltage position control. That is, when the load current is increased rapidly from light load condition to heavy load condition, the inductor current is increased accordingly. However, the reference $V_{REF}$ keeps constant, thus the output voltage $V_O$ is deceased according to equation (3) and/or equation (10). In contrast, when the load current is decreased rapidly from heavy load condition to light load condition, the inductor current is decreased accordingly. However, the reference $V_{REF}$ keeps constant, thus the output voltage $V_O$ is increased according to equation (3) and/or equation (10). Therefore, circuit 100, circuit 200, circuit 300, circuit 400, circuit 500, circuit 600, circuit 700, and circuit 800 realize the advantages of the AVP control such as a wide variation range of the output voltage and low loss. In addition, compared to prior art circuit 50, the circuits provided in the present invention do not need the two external pins and other external components such as the current source $U_S$ used in circuit 50, which makes the internal circuit simpler.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. An adaptive voltage position DC-DC regulator, comprising:
 a main circuit having an output inductor and an output capacitor coupled in series, the output capacitor being coupled in parallel to a load;
 and a control circuit, wherein the control circuit comprises:
 a sensing unit having a sensing resistor and a sensing capacitor coupled in series, electrically coupled to the output inductor of the main circuit, operable to provide a sensing signal corresponding to a voltage across the output inductor;
 a resistor coupled between the output inductor and the output capacitor, the sensing resistor and the sensing capacitor being in parallel to both the output inductor and the resistor;
 a feedback unit, electrically coupled to the sensing unit, operable to receive the sensing signal and to provide a feedback signal based on the voltage across the output inductor;
 a comparing unit, electrically coupled to the feedback unit, operable to compare the feedback signal to a reference signal and to provide a comparison signal corresponding to a difference between the feedback signal and the reference signal;
 a PWM generator, electrically coupled to the comparing unit, operable to receive the comparison signal and to provide a PWM signal based on the comparison signal; and
 a driver, electrically coupled to the PWM generator, operable to provide a driving signal to the main circuit based on the PWM signal.

2. The adaptive voltage position DC-DC regulator of claim 1, wherein the main circuit is one of a buck circuit, a half-bridge isolated converter, a full-bridge isolated inverter, and a forward isolated inverter.

3. The adaptive voltage position DC-DC regulator of claim 1, wherein the PWM generator has a second input terminal configured to receive a clock signal.

4. The adaptive voltage position DC-DC regulator of claim 1, wherein the PWM generator further includes a third input terminal configured to receive and inductor current or a sensed current flowing through a switch in the main circuit.

5. The adaptive voltage position DC-DC regulator of claim 1, wherein:
 the sensing resistor and the sensing capacitor are in parallel to the output inductor;
 the feedback unit comprises a first resistor and a second resistor coupled in series;
 the first resistor having a first end coupled to a node between the sensing resistor and the sensing capacitor and a second end to the second resistor; and
 the comparing unit comprises a comparator having a first terminal coupled to the reference signal and a second terminal coupled to the second end of the first resistor of the feedback unit, the comparator further having an output terminal coupled to the PWM generator.

6. The adaptive voltage position DC-DC regulator of claim 1, wherein
 the sensing resistor is a first sensing resistor;
 the sensing unit further includes a second resistor having a first end coupled to the node between the first sensing resistor and the sensing capacitor and a second end coupled to a node between the output inductor and the output capacitor.

7. The adaptive voltage position DC-DC regulator of claim 1, wherein the sensing resistor, the sensing capacitor, and the output inductor have respective values that satisfy the following:

$$C_S * R_S = \frac{L}{DCR}$$

wherein Cs is a capacitance of the sensing capacitor, Rs is a resistance of the sensing resistor, L is an inductance of the output inductor, and DCR is a direct current resistance of the output inductor.

8. A direct current to direct current voltage regulator, comprising:
- a main circuit having an output inductor and an output capacitor coupled in series, the output capacitor being coupled in parallel to a load;
- a sensing unit coupled in parallel to the output inductor, the sensing unit having a sensing resistor and a sensing capacitor;
- a resistor coupled between the output inductor and the output capacitor, the sensing resistor and the sensing capacitor being in parallel to both the output inductor and the resistor;
- a feedback unit coupled to the sensing unit to receive the sensing signal and to provide a voltage signal based on the sensing signal;
- a comparator having a first input terminal, a second input terminal, and an output terminal, the first input terminal being coupled to the sensing unit, the second input terminal being coupled to a reference terminal, the comparator being configured to compare the voltage signal to a reference signal and to generate a comparison signal corresponding to a difference between the voltage signal and the reference signal; and
- a PWM generator coupled to the output terminal of the comparator to receive the comparison signal and to provide a PWM signal to the main circuit based on the comparison signal.

9. The direct current to direct current voltage regulator of claim 8, wherein the sensing resistor, the sensing capacitor, and the output inductor have respective values that satisfy the following:

$$C_S * R_S = \frac{L}{DCR}$$

wherein Cs is a capacitance of the sensing capacitor, Rs is a resistance of the sensing resistor, L is an inductance of the output inductor, and DCR is a direct current resistance of the output inductor.

10. The direct current to direct current voltage regulator of claim 8, wherein:
- the sensing resistor having a first end coupled to the output inductor and a second end coupled to the sensing capacitor;
- the direct current to direct current voltage regulator further includes a feedback unit having a first resistor and a second resistor in series, the first resistor being coupled to the second end of the sensing resistor and to the second resistor; and
- the first input terminal of the comparator is coupled to the sensing unit via the first resistor of the feedback circuit.

11. The direct current to direct current voltage regulator of claim 8, wherein
- the sensing resistor is a first sensing resistor;
- the sensing unit further includes a second resistor having a first end coupled to the node between the first sensing resistor and the sensing capacitor and a second end coupled to a node between the output inductor and the output capacitor.

12. The direct current to direct current voltage regulator of claim 8, wherein the main circuit is a buck circuit having a first switch, a second switch, and a driver coupled to the first and second switches, and wherein the driver is coupled to the PWM generator to receive the PWM signal and is configured to control the first and second switches based on the received PWM signal.

13. A direct current to direct current voltage regulator, comprising:
- a main circuit having an output inductor and an output capacitor coupled in series, the output capacitor being coupled in parallel to a load;
- a sensing resistor having a first end coupled to the output inductor and a second end coupled to the output capacitor;
- a feedback unit coupled to the first end of the sensing resistor to provide a voltage signal;
- a comparator having a first input terminal, a second input terminal, and an output terminal, the first input terminal being coupled to the feedback unit to receive the voltage signal, the second input terminal being coupled to a reference terminal, the comparator being configured to compare the voltage signal to a reference signal and to generate a comparison signal corresponding to a difference between the voltage signal and the reference signal; and
- a PWM generator coupled to the output terminal of the comparator to receive the comparison signal and to provide a PWM signal to the main circuit based on the comparison signal.

14. The direct current to direct current voltage regulator of claim 13, wherein:
- the direct current to direct current voltage regulator further includes a feedback unit having a first resistor and a second resistor, the first resistor being coupled between the first end of the sensing resistor and the second resistor; and
- the first input terminal is coupled to the first end of the sensing resistor via the first resistor of the feedback unit.

15. The direct current to direct current voltage regulator of claim 13, wherein the main circuit is a buck circuit having a first switch, a second switch, and a driver coupled to the first and second switches, and wherein the driver is coupled to the PWM generator to receive the PWM signal and is configured to control the first and second switches based on the received PWM signal.

16. The direct current to direct current voltage regulator of claim 13, wherein the direct current to direct current voltage regulator does not include a current source coupled to the first or second input terminal of the comparator.

* * * * *